Sept. 12, 1967  E. L. WEIMER  3,340,643
SPINNER TYPE MAGNETIC FISHING LURE
Filed April 12, 1965
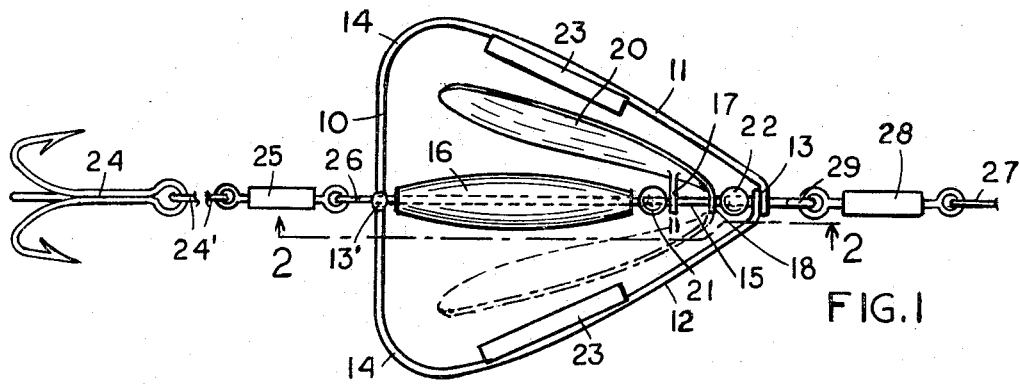
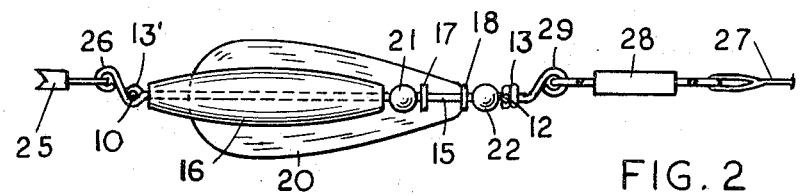
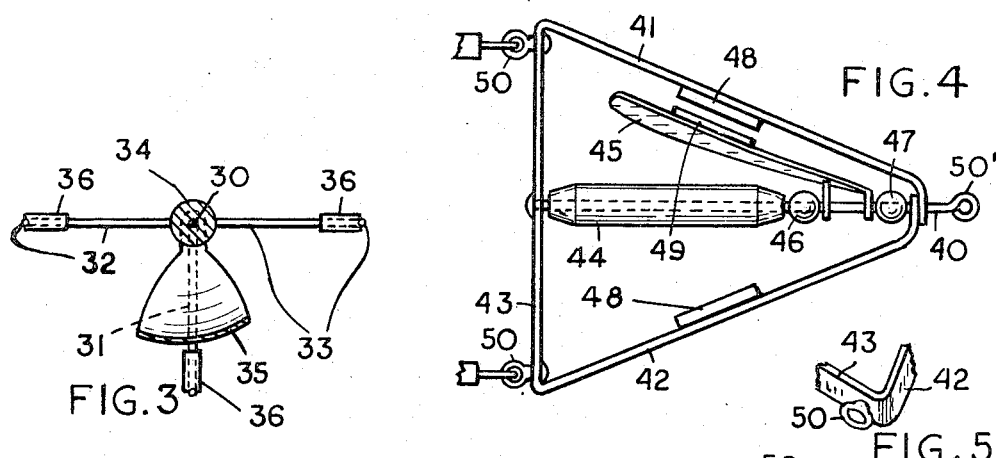
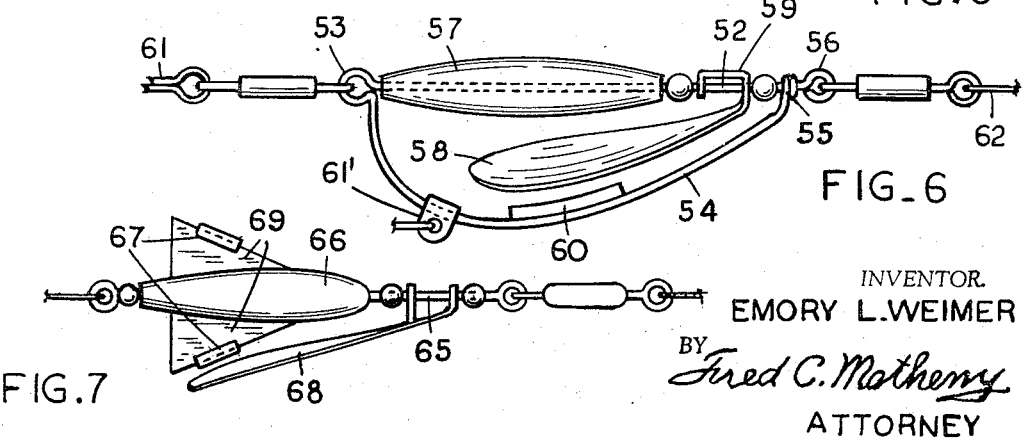
INVENTOR.
EMORY L. WEIMER
BY Fred C. Matheny
ATTORNEY

United States Patent Office 3,340,643
Patented Sept. 12, 1967

3,340,643
SPINNER TYPE MAGNETIC FISHING LURE
Emory L. Weimer, Orondo, Wash. 98843
Filed Apr. 12, 1965, Ser. No. 447,407
7 Claims. (Cl. 43—42.12)

My invention relates to a spinner type magnetic fishing lure and an object of my invention is to provide a lure in which permanent magnet means is used to impart irregular motion to a water driven spinner and to frame means by which the spinner is supported thereby rendering the lure more attractive and alluring to fish.

Another object is to provide a lure comprising frame means, a water driven spinner rotatively supported by said frame means and having a magnetic part which is movable past at least one magnetic part of the frame means as the spinner rotates, the attraction between the magnetic parts of the spinner and frame means serving to retard and slow down, but not to stop, the rotary movement of the spinner each time a magnetic part of the spinner passes a magnetic part of the frame means, thereby rendering the rotary movement of the spinner somewhat irregular and jumpy and imparting a rocking or wabbling movement to the frame means, all of which makes the lure more alluring to fish.

Other objects of my invention will be apparent from the following description and accompanying drawings.

In the drawings,

FIGURE 1 is a plan view of a spinner type lure constructed in accordance with my invention.

FIG. 2 is an edge view of the same locking in the direction of broken line 2—2 of FIG. 1.

FIG. 3 is a view, partly in cross section and partly in elevation, of a modified form of lure showing a frame which has three spaced apart side bars, said view being taken transverse to the axis of the lure.

FIG. 4 is a plan view of another lure of modified form.

FIG. 5 is a fragmentary perspective view of a part of the lure shown in FIG. 4.

FIG. 6 is a side view of another lure of modified form showing a frame comprising a bearing bar and a curved side bar arched away from said bearing bar.

FIG. 7 is a side view of another lure of modified form.

Like reference numerals refer to like parts throughout the several views.

Referring first to FIGS. 1 and 2, the lure shown therein comprises a wire frame of generally triangular shape formed of a rear cross bar 10 and two forwardly extending inclined side bars 11 and 12 which converge to a narrow forward end 13 where they are connected together. Preferably the rear corners 14 of said frame are rounded where the side bars 11 and 12 connect with the rear cross bar 10. A medial bar 15 has its rear end secured at 13' to the cross bar 10 mid-way of the length of said cross bar and has its forward end secured to the narrow forward end portion 13 of the frame. Preferably the medial bar 15 carries a relatively long bead 16 which extends from near the rear cross bar 10 forwardly but terminates in spaced relation from the forward end 13 of the frame. This leaves a substantial length of the medial bar 15 exposed so it can be used as a bearing for two spaced apart bearing lugs 17 and 18 of a spoon shaped spinner member 20. Preferably two spherical beads 21 and 22 are provided on the medial bar 15 to serve as thrust bearing members for the respective lugs 17 and 18. The two bearing lugs 17 and 18 are spaced far enough apart to insure smooth spinning movement with no binding of the spinner member 20.

The spinner member 20 is formed of light reflective or brightly colored magnetic material, such as sheet iron with a bright external surface. A permanent magnet 23 is attached to each side bar 11 and 12 and is positioned close enough to the path of movement of the spinner 20 so that when the spinner is being rotated at or near the normal speed it will have in the water each magnet 23 will retard or produce a hesitating movement of the spinner each time it passes a magnet. This gives the spinner a jumpy appearance and has been found to increase its alluring characteristics for fish.

A hook 24 is connected with the rear cross bar 10 and bearing bar 15 in any suitable manner, for instance by an eye member 26 and a swivel 25 and a line or leader 24' of any desired length. Also a fish line 27 is connected by means, such as a swivel 28 and eye member 29, with the narrow forward end 13 and bearing bar 15 of the frame. Preferably the eye members 26 and 29 are both formed so that they extend above the plane of the frame composed of members 10, 11, 12 and 15. This helps to maintain said frame in a horizontal position in the water and thus helps to prevent rotation of said frame because the heavier frame with magnets 23 will tend to hang below the line of pull exerted by the parts connected with the eyelets 26 and 29.

When the lure of FIGS. 1 and 2 is drawn through water or is held stationary in running water spinner 20 will be caused to rotate and will be slightly retarded by magnetic force each time it passes one of the magnets 23. This will give it an erratic or jumpy movement and will cause the frame to rock or wabble thus making the lure more alluring to fish than it would be if the spinner speed was uniform.

FIG. 3 shows a lure of modified form in which a frame comprises a medial bearing bar 30 and three outwardly arched frame bars 31, 32 and 33. Preferably the frame bars 32 and 33 are positioned in a common plane radial to the bearing bar 30 and they will tend to assume a horizontal position in the water. The frame bar 31 is positioned mid way between the bars 32 and 33 and it will tend to hang downwardly in the water and all of said bars are secured to each other and to the medial bar 30 at the two ends of the lure. Each bar 31, 32 and 33 is similar in shape to the side bars 11 and 12 and their forward ends are joined at a location similar to the joined end location 13 of FIG. 1. Thus the frame shown in FIG. 3 is similar to the frame shown in FIGS. 1 and 2 except that it consists of three instead of two outwardly arched side frame bars. A bead 34, a spinner 35 of magnetic material and three permanent magnets 36, all shown in FIG. 3, correspond respectively to the previously described parts 16, 20 and 23 of FIG. 1, one magnet being attached to each bar 31, 32 and 33.

The lure shown in FIG. 3 operates similarly to the lure shown in FIGS. 1 and 2 except that the spinner 35 will be caused by the magnets 36 to hesitate three times on each revolution it makes. Also the three frame members 31, 32 and 33 of FIG. 3 provide a more efficient shield for protecting the spinner 35 against snagging on obstructions in the water than is provided by the two frame members shown in FIGS. 1 and 2.

The frame of the modified form of lure shown in FIG. 4 comprises a medial frame bar 40, two oppositely positioned inclined side frame bars 41 and 42 and a rear frame bar 43. The side frame bars 41 and 42 have their forward end portions secured to each other and to the medial bar 40 and they diverge rearwardly and together with the rear frame bar 43 form a triangular frame. Preferably the medial bar 40 is a round rod and it serves as a support for a long bead 44, two spherical thrust beads 46 and 47 and a spinner member 45, which are respectively similar to the bead 16, the two beads 21 and 22 and the spinner 20 of FIGS. 1 and 2. A permanent magnet 49 of one polarity is secured to the outer side of the spinner 45. A permanent magnet 48 of opposite polarity from the magnet 49 is secured to each side frame bar 41 and 42. Obviously the spinner 45 may be of various different shapes and may be made of any durable material which is bright and light reflective or which is colored to add to its alluring characteristics. The side frame members 41 and 42 and rear frame member 43 are preferably formed of flat material of rectangular cross section, FIG. 5, and this material is preferably bright and light reflective or colored to render it alluring to fish. Preferably means, such as two eye members 50 to which two trailing hook assemblies may be attached, are provided at the rear corners of the frame shown in FIG. 4. Also means, such as an eye member 50', is provided at the forward end of the medial frame bar 40 for connection with a line. The eye members 50 and 50' can be offset upwardly so that they will normally be above the plane of the frame 41, 42, 43, similarly to eye members 26 and 29 of FIGS. 1 and 2.

The lure of modified form shown in FIG. 6 includes a frame formed of a single piece of wire shaped to provide a straight part 52 which is connected at its rear end by a loop 53 with a downwardly arched part 54. The forward end 55 of the part 54 is wound around or otherwise secured to the forward end portion of the straight frame part 52. Said straight frame part 52 terminates at its forward end in a loop 56 for connection with a line 62. A long bead 57 is provided on frame part 52 and a spinner member 58 has a rearwardly bent channel shaped part 59 forming two spaced apart bearing members which are journaled on the frame bar 52 forwardly of the bead 57. The spinner member 58 is of magnetic material and is shaped so it will be rotated by the action of the water thereon. Preferably eye members 53 and 56 are upwardly offset in the same manner as eye members 26 and 29 of FIG. 2. A permanent magnet 60 is secured to the arched frame member 54 in a position close to the path of rotation of the spinner 58 so it will retard and render erratic the movement of the spinner 58 and will rock the frame 54 each time the spinner 58 passes the magnet 60. Any suitable hook means 61 can be connected with the eye member 53 and preferably an eye piece 61' to which another string of hooks may be attached is provided on the lower rear portion of the frame member 54. The magnet 60 and frame bar 54 act as weights which will tend to hang vertically and will normally prevent rotation of the frame member 54 but will allow for a rocking movement of said frame member 54 each time the spinner 58 passes the magnet 60. The spinner 58 operates in substantially the same manner as the previously described spinners 20, 35 and 45 except that it will only be retarded at one point in each revolution.

In the modified form of lure shown in FIG. 7 the outside frame parts are dispensed with and the frame is disposed within the path of rotation of a spinner member 68. Said frame comprises a rod or bar 65 upon which are mounted a bead member 66 and one or more fins 69, each of which carries a magnet 67. In the illustrative embodiment shown in FIG. 7 the spinner 68 is of magnetic material but it will be understood that the vane or vanes 69 may each be of magnetic material and that the spinner may be magnetized or a magnet attached thereto or that magnets of opposite polarity may be used in the manner illustrated in FIG. 4. Preferably the spinner 68, bead 66 and vanes 69 are all brightly colored or light reflective to render them more alluring to fish. The spinner 68 is rotatively supported on the frame bar 65 and the bar 65, bead 66 and fins 69 are all supported within the path of rotation of said spinner 68. The vanes 69 are radial and will tend to move straight in the water. However they can be shaped or positioned so they will tend to rotate in the water. For instance they may be shaped or positioned so they will tend to rotate in a direction opposite to the direction of rotation of the spinner 68 in the water. Magnetic attraction between the parts shown in FIG. 7 will cause the spinner to hesitate in its rotation and the frame parts to rock or wabble in the same manner as explained in connection with FIGS. 1 to 6. Thus all forms of the invention herein disclosed comprise frame means, a spinner rotatively supported by said frame means and permanent magnet devices connected with the spinner and frame means in such a manner as to influence and render somewhat erratic and more alluring the movement of both the spinner and the frame means.

Obviously changes in my lure may be made within the scope of the following claims.

I claim:

1. In a fishing lure, a frame part; a water driven spinner supported for spinning movement by said frame part, said spinner being adapted to be rotatively moved past a portion of said frame part by relative movement of the lure and the water in which it is immersed; and permanent magnet means carried by the lure and positioned to provide magnetic attraction between said spinner and the frame part past which it moves, said magnetic attraction rendering erratic the movement of said spniner and said frame part as said spinner is moving past said frame part.

2. A fishing lure comprising a frame member; line attachment means connected with the forward end portion of said frame member; hook attachment means connected with the rear end portion of said frame member; a water driven spinner having a forward end portion rotatively mounted on said frame member and having a rearwardly extending portion rotatable in a path around said frame member and spaced outwardly from said frame member; a frame part supported from said frame member and positioned close to but clear of the path of rotation of the rearwardly extending portion of said spinner; and two bodies of magnetizable material, at least one of which is a permanent magnet embodied in and forming portions of said frame part and said spinner respectively and capable of being magnetically attracted to each other when said spinner is close to said frame part, whereby irregular movement is imparted by magnetic attraction to said spinner and said frame part as the spinner moves past the frame part.

3. The apparatus as claimed in claim 2 in which at least one bright and light reflective bead is provided on said frame member and in which the spinner rotates around said bead.

4. In a fishing lure, spaced apart frame members; a water driven spinner of magnetic material supported for rotary movement between said frame members and having a part which is successively moved past said frame members as said spinner is rotated; and a permanent magnet rigid with each of said frame members and positioned to magnetically attract the spinner as it moves past the frame member, the magnetic attraction rendering erratic the movement of the spinner and the frame members as the spinner moves past the frame members.

5. A fishing lure comprising a medial frame bar; at least two angularly spaced apart side frame members connected at a common forward end point with said medial frame bar and extending rearwardly from said common forward end point in divergent relation to said medial frame bar; a water driven spoon shaped spinner member rotatably supported on and movable around said medial frame bar past each of said side frame members; and permanent magnet means provided in connection with said side frame members and said spinner and positioned to exert magnetic attraction between said side frame members and said spinner, the magnetic attraction rendering irregular the rotary movement of said spinner and imparting rocking movement to said side frame members as the spinner moves past the side frame members.

6. A fishing lure comprising a substantially straight frame bar; line attachment means connected with the forward end portion of said frame bar; hook attachment means connected with the rear end portion of said frame bar; at least one side frame member connected with the forward end portion of said frame bar and extending rearwardly in divergent relation from said frame bar; a water driven spinner of magnetic material rotatively mounted on said frame bar and movable past said side frame member as it is rotated; and a permanent magnet carried by the side frame member and positioned adjacent the path of rotary movement of said spinner, whereby it will exert magnetic force on said spinner and produce irregular movement of said spinner and rocking movement of said frame bar each time said spinner moves past said permanent magnet.

7. A fishing lure comprising a substantially straight frame bar; line attachment means connected with the forward end portion of said frame bar; hook attachment means connected with the rear end portion of said frame bar; at least one vane supported from said frame bar; a water driven spinner rotatively mounted on said frame bar and movable in a path around said frame bar and vane; and permanent magnet means connected with and providing for magnetic attraction between the spinner and the vane, said magnetic attraction rendering irregular the movement of said spinner and frame bar and vane as said spinner rotates.

References Cited
UNITED STATES PATENTS

| | | | |
|---|---|---|---|
| 576,680 | 2/1897 | Kittle | 43—42.12 |
| 2,306,692 | 12/1942 | Flood | 43—42.21 |
| 2,574,293 | 11/1951 | Sabin et al. | 43—42.12 |
| 2,653,408 | 9/1953 | Bradley | 43—42.12 |
| 2,871,608 | 2/1959 | Fisher | 43—35 |
| 2,977,707 | 4/1961 | Dreher | 43—42.12 |

SAMUEL KOREN, *Primary Examiner.*

WARNER H. CAMP, *Examiner.*